(12) United States Patent
Swift

(10) Patent No.: US 7,503,467 B1
(45) Date of Patent: Mar. 17, 2009

(54) ROTARY AND/OR LINEAR ACTUATOR SYSTEM FOR CONTROLLING OPERATION OF AN ASSOCIATED TOOL

(75) Inventor: Gerald Liam Swift, Yaphank, NY (US)

(73) Assignee: Anorad Corporation, Shirley, NY (US)

( * ) Notice: Subject to any disclaimer, the term of this patent is extended or adjusted under 35 U.S.C. 154(b) by 954 days.

(21) Appl. No.: 10/815,047

(22) Filed: Mar. 31, 2004

Related U.S. Application Data

(63) Continuation of application No. 10/035,942, filed on Dec. 26, 2001, now Pat. No. 6,719,174.

(51) Int. Cl.
*B67D 5/06* (2006.01)
*B65D 88/54* (2006.01)
*G01F 11/20* (2006.01)

(52) U.S. Cl. .................. 222/333; 222/181.3; 222/413; 222/1; 173/152; 408/129

(58) Field of Classification Search .............. 222/181.3, 222/413, 333, 1; 173/152, 117; 408/129
See application file for complete search history.

(56) References Cited

U.S. PATENT DOCUMENTS

| 3,790,040 | A | * | 2/1974 | Bahr et al. | ................ | 222/413 |
| 4,462,467 | A | * | 7/1984 | Weingartner | ............... | 173/105 |
| 4,958,967 | A | * | 9/1990 | Adachi | .................. | 409/185 |
| 6,234,358 | B1 | * | 5/2001 | Romine et al. | ........... | 222/181.3 |

* cited by examiner

*Primary Examiner*—Kevin P Shaver
*Assistant Examiner*—Melvin A Cartagena
(74) *Attorney, Agent, or Firm*—Amin Turocy & Calvin LLP; Alexander R. Kuszewski

(57) ABSTRACT

A rotary-linear system is configured to operate an associated tool. The system includes a rotary-linear actuator having first and second portions that can move linearly and/or rotationally relative to each other, such as about a central axis extending through the actuator. An elongated drive rod extends axially through at least a portion of the actuator, which is operative to rotate about a longitudinal axis thereof generally independently of the actuator. While the rotation of the drive rod can be independent of movement of the actuator, such rotation can be controlled based on the position and/or movement of the actuator. An end of the drive rod near a distal end of the actuator is operative to actuate an associated tool, such as can be mounted at a distal end of the actuator.

31 Claims, 5 Drawing Sheets

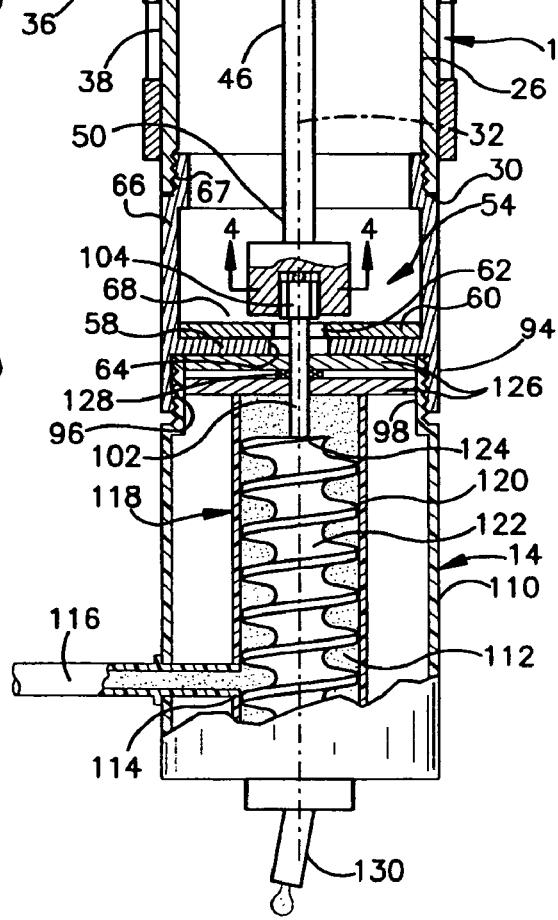

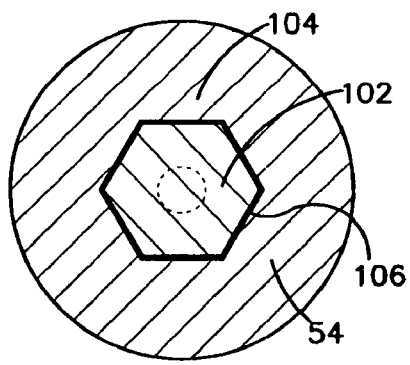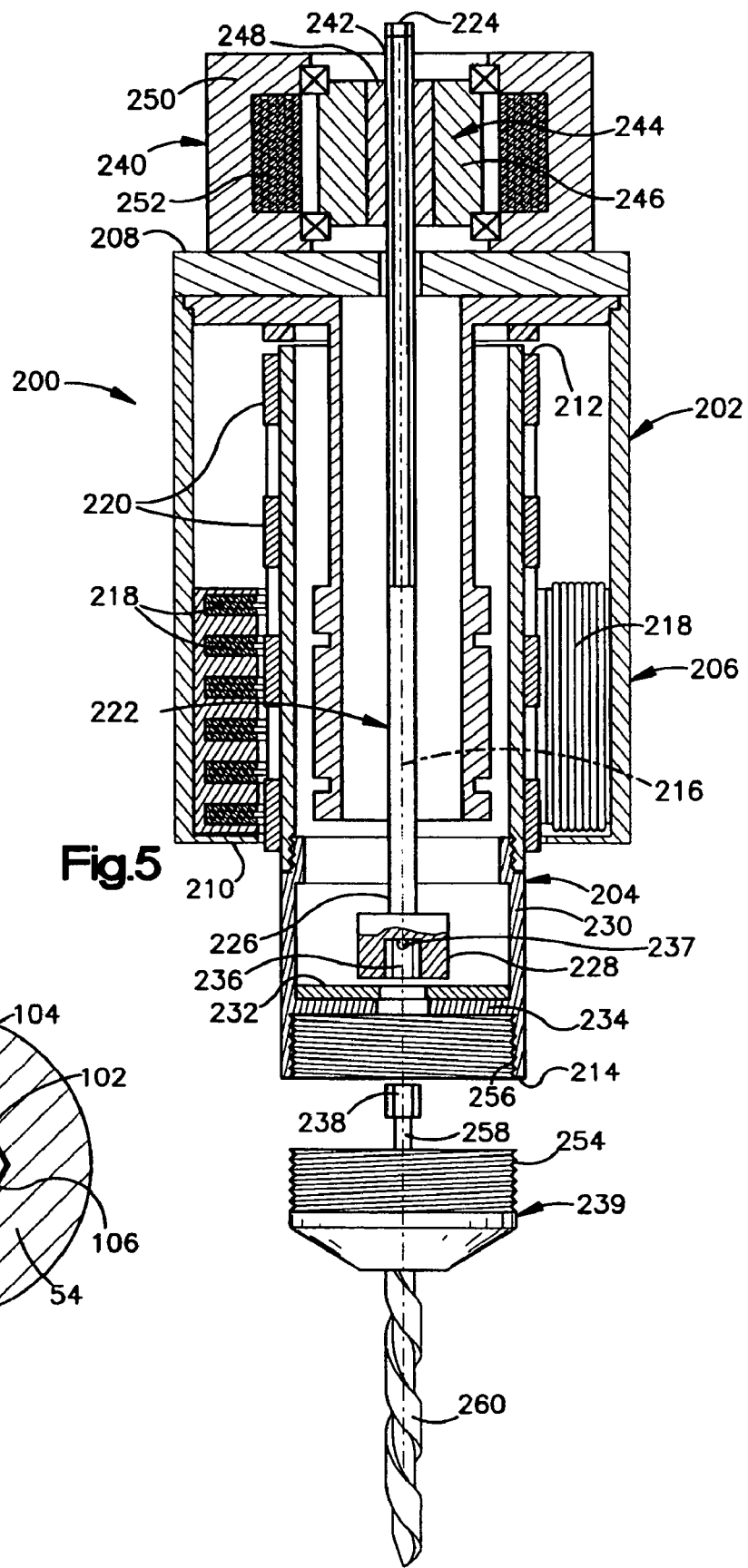

ROTARY AND/OR LINEAR ACTUATOR SYSTEM FOR CONTROLLING OPERATION OF AN ASSOCIATED TOOL

CROSS-REFERENCE TO RELATED APPLICATIONS

This application is a Continuation of U.S. patent application Ser. No. 10/035,942 entitled "ROTARY AND/OR LINEAR ACTUATOR SYSTEM FOR CONTROLLING OPERATION OF AN ASSOCIATED TOOL" and filed on Dec. 26, 2001 now U.S. Pat. No. 6,719,174, the entirety of which is incorporated herein by reference.

TECHNICAL FIELD

The present invention relates to motors and, more particularly, to linear and/or rotary system operative to control operation of an associated tool.

BACKGROUND OF THE INVENTION

Various kinds of actuators are employed in manufacturing different products. The type of actuator usually is selected based on design tolerances and precision required to manufacture the products with such tolerances. For example, linear actuators are used for numerous tasks where a linear movement or application of a generally linear force is desired. Rotary actuators are employed to rotate or spin objects. In some circumstances, it is desirable to combine linear and rotary actuators to provide both linear and rotary movement of an object.

Some typical manufacturing environments that employ one or more different types of robotic actuators include semiconductor manufacturing processes (e.g., pick and place systems), printed circuit board fabrication (e.g., the placement and connection of circuit components onto the circuit board), etc. Often times, the robotic actuators are programmed and/or configured to move one or more tools between one or more locations at which the tools are to operate on a work piece.

In order to remain competitive in today's global economy, manufacturers require actuators that can achieve greater precision and speed so as to increase production rates. Thus, it is desirable to provide an actuator capable of quickly and accurately positioning a tool in associated manufacturing processes.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides an actuator system for operating a tool. The actuator system includes a housing and an elongated plunger mounted within the housing for rotary and linear movement relative to the housing and a central axis extending longitudinally through the plunger. An elongated drive rod extends within at least a portion of the rotary linear actuator substantially parallel to the central axis. Part of the drive rod is connected with the plunger so that the drive rod moves linearly commensurate with the linear movement of the plunger. The drive rod further is capable of independent rotary movement relative to plunger. In a particular aspect of the present invention, a drive system is operatively connected to rotate the drive rod about its longitudinal axis independently of movement of the plunger.

In accordance with another aspect of the present invention, a tool assembly can be attached, either removably attached or permanently fixed, to the plunger so that rotation of the drive rod relative to the plunger activates the tool assembly. For example, the tool assembly can be glue dispenser operative to dispense a desired amount of an adhesive material in response to rotation of the drive rod.

Another aspect of the present invention provides a method for controlling a tool system. For example, the tool system includes a rotary-linear actuator that can provide linear and rotary movement of a plunger relative to a housing. A drive rod is associated with the actuator to move linearly with plunger and further can rotate independently of relative to the plunger. At least one of rotary and linear position of the plunger is adjusted to a desired position. After the plunger is at a desired position, the drive rod can be rotated independently of plunger so as to activate an associated tool.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 2 is a partial side sectional view of a rotary-linear tool system in accordance with an aspect of the present invention, illustrating the tool in a second condition.

FIG. 3 is a cross sectional view of part of a rotary-linear tool system taken along line 3-3 of FIG. 1.

FIG. 4 is a sectional view of a rotary linear tool system in accordance with an aspect of the present invention.

FIG. 5 is a partial side sectional view of a rotary-linear tool system in accordance with an aspect of the present invention, illustrating a tool assembly in a detached condition.

DETAILED DESCRIPTION OF THE INVENTION

The present invention provides a rotary-linear system configured to operate an associated tool. The system includes a rotary-linear actuator having first and second portions that can move linearly and/or rotationally relative to each other, such as about a central axis extending through the actuator. A drive rod extends axially through at least a portion of the actuator, which is operative to rotate about a longitudinal axis thereof independently relative to the actuator. While the rotation of the drive rod can be independent of movement of the actuator, such rotation can be controlled based on the position and/or movement of the actuator. The drive rod can be operatively associated with a tool, so that movement of the drive rod is transferred to drive a tool. Thus, by controlling rotation of the drive rod, the operation of the associated tool also can be controlled.

Figure 1:
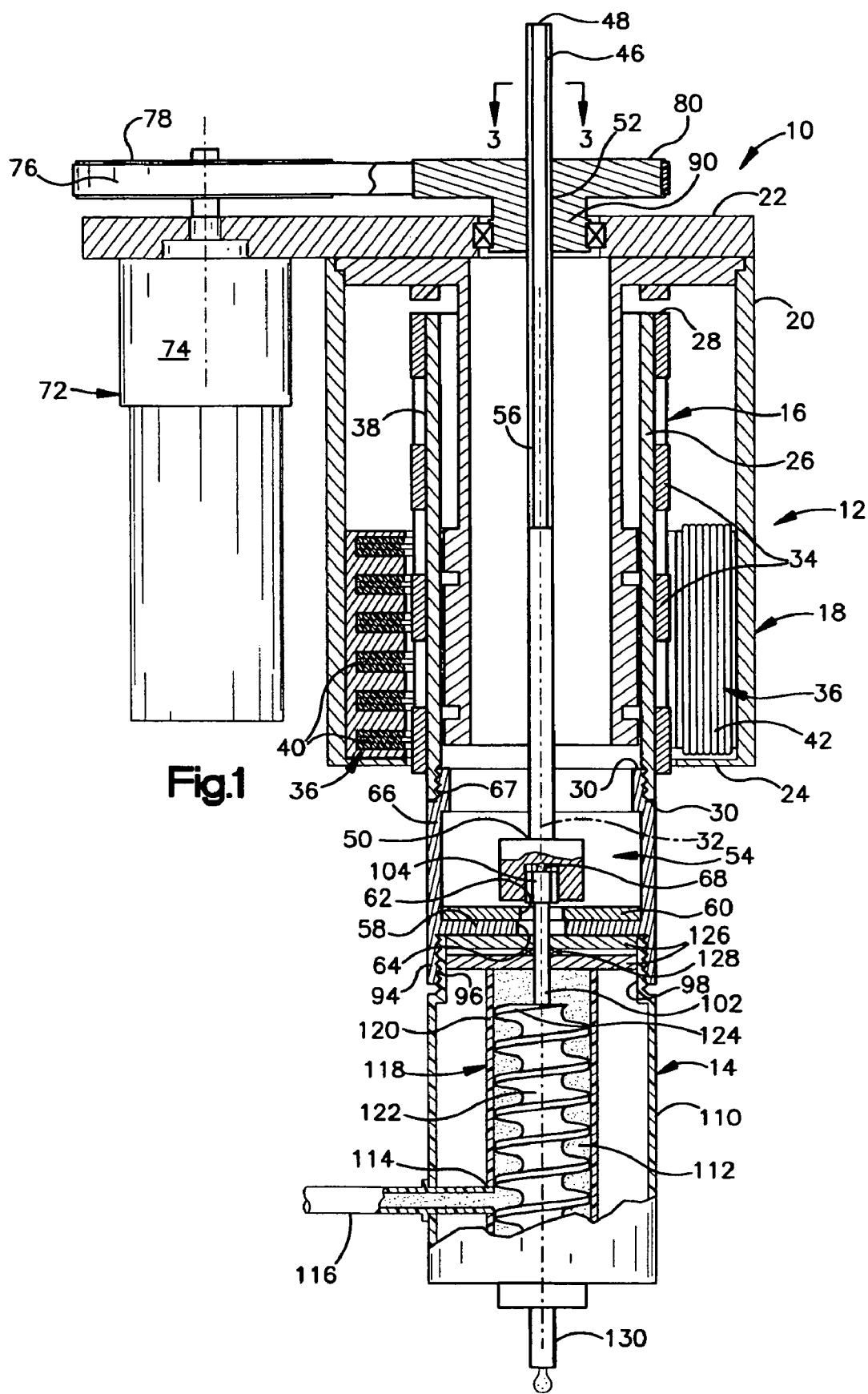
FIG. 1 is a partial side sectional view of a rotary-linear tool system in accordance with an aspect of the present invention, illustrating the tool in a first condition.

FIGS. 1 and 2 illustrate a high-precision tool system 10 in accordance with an aspect of the present invention. The tool system 10 includes a rotary-linear actuator 12 and a tool assembly 14 operatively associated with the actuator. The actuator 12 includes an inner portion (or plunger) 16 that is moveable relative to a housing 18. The housing 18 has an outer sidewall portion 20 that extends between spaced apart ends 22 and 24. The plunger 16 has a generally cylindrical sidewall portion 26 that extends between spaced apart end portions 28 and 30. The proximal end 28 of the plunger 16 thus can travel between the ends 22 and 24 of the housing 18 according to relative movement between the plunger and housing. In particular, the plunger 16 can move rotationally about and/or linearly along an axis 32 that extends through the ends 28 and 30 thereof. Appropriate bearings (low friction or air bearings) or other guide mechanisms (not shown) facilitate desired relative motion between the plunger 16 housing 18.

The actuator 12 further includes an arrangement of magnets 34 and windings 36. The magnets and windings are operatively associated with the housing 18 and the plunger 16 to enable desired linear and rotary motion therebetween. It is to be understood and appreciated that the magnets can be mounted to one of an inner portion of the housing 18 and an exterior 38 of the plunger sidewall portion 26 and the windings 36 can be mounted to a different one of the respective exterior of the plunger sidewall portion and inner portion of the housing 18.

In the example illustrated in FIGS. 1 and 2, the magnets 34 are disposed on the exterior portion 38 of the plunger 16, such that adjacent magnets have alternating polarities. A portion of the magnets 34 are oriented so that their north poles point radially outward and another portion of the magnets are oriented so that their north poles point radially inward. For example, the magnets 34 are arranged along the exterior portion 38, such that a circumferential array of magnets that circumscribe a portion of the plunger 16. The magnets 34 further can be arranged so one magnetic polarity alternate with adjacent axially displaced arrays of magnets having an opposite polarity and axially extending columns of one polarity alternate with columns of opposite polarity (e.g., a circular cylindrical sidewall having a substantially checker-board like array of magnets).

U.S. Pat. No. 6,215,206 discloses examples of possible magnet and winding configurations for a rotary-linear actuator, all of which could be utilized in accordance with an aspect of the present invention. For example, the magnets 34 could be round and arranged in a pattern or they could be diamond shaped and arranged in a desired pattern, such that adjacent magnets have different relative magnetic polarity. The alternative arrangements of magnets have different torque characteristics that may be desirable for a rotary-linear actuator in specific applications. Those skilled in the art will further understand and appreciate various configurations of magnets and associated windings 36 that could be employed to facilitate rotational and linear movement of the plunger 16 relative to the housing 18, which are equally applicable to the tool system 10 of the present invention.

Referring back to FIGS. 1 and 2, more than one set of windings 36 (e.g., two or more) are arranged along an interior portion of the housing so as to provide magnetic fields that interact with adjacent magnets and, in turn, effect desired rotational and/or linear movement of the plunger 16. For example, the windings 36 include a set of z-axis coils 40, which extend circumferentially around part of the plunger to facilitate relative axial movement between the plunger 16 and housing 18. The z-axis coils 40 are shaped and mounted to the housing 18, such that current in them generates a magnetic field that interacts with the magnets to move the plunger axially. The windings 36 also include a set of ?-axis coils 42. The ?-axis coils 42 have longitudinal axes that are substantially parallel to the axis 32 of the plunger 16 and facilitate rotational movement between the plunger and the housing 18. The ?-axis coils 42 are dimensioned and configured so that an energization current in them generates a magnetic field that interacts with the magnets 34 to provide a tangential force on the columns of magnets to provide for relative rotational movement between the plunger 16 and the housing 18.

Each set of the coils 40, 42 can be three-phase coils, although other number of phases could be utilized to implement such a tool system 10. It is to be understood and appreciated that any configuration windings can be used in accordance with an aspect of the present invention. For example, different numbers of windings could be employed in an actuator 12, such as depending on the resolution and size of the actuator required for the application. In addition, the lengths and widths of coils and may differ substantially from that shown herein.

A power supply (not shown) provides operating power, which can be directed to the coils 40 and 42, such as described herein. Any suitable power supply (e.g., battery, line power) may be utilized to carry out the present invention. An associated control system and amplifier are operative to energize the coils 40 and 42 with power to drive the plunger in a desired direction. As a result of the relationship between the magnets and sets of windings, the plunger 16 can be driven linearly and/or rotationally relative to the housing 18.

The tool system 10 also includes an elongated drive rod 46 that extends between spaced apart ends 48 and 50 thereof substantially parallel to the actuator axis 32. For example, the drive rod 48 extends substantially coaxially through the plunger 16 and the housing 18. A proximal end 48 of the drive rod 46 is located near the proximal end 22 of the housing 18. The housing 18 has an aperture 52 through which the drive rod 46 can traverse. The aperture 52 is dimensioned and configured according to the cross-sectional dimensions and configuration of the drive rod 46 (e.g., the aperture approximates the outer diameter of the drive rod). The distal end 50 of the drive rod is connected to a coupling 54 located near the distal end 30 of the plunger 16. An intermediate portion 56 of the drive rod 46 extends between the coupling 54 and the proximal end 48 of the drive rod.

The coupling 54 can be at a generally fixed axial position relative to the distal end 30 of the plunger 16. For example, the coupling 54 is formed of a magnetic material (e.g., iron, steel, a suitable alloy, etc.) and is preloaded into engagement with a rigid shelf 58 or other structure located near the distal end 30 of the plunger 16. In the example of FIGS. 1 and 2, the coupling 54 is magnetically preloaded by an arrangement of one or more permanent magnets 60 that attract the coupling axially toward the shelf 58. The magnet 60 can be configured as one or more generally flat discs permanently magnetized material having a central aperture 62 extending through the disc. A central aperture 64 also extends through the shelf 58 to permit desired attachment of the tool assembly 14 to the coupling 54 through the shelf and the magnet 60. It is to be appreciated that the coupling 54 can move a limited axial distance relative to the plunger 16, such as within its associated coupling chamber 66, if an axial force is applied to tool assembly 14 in a direction opposite to and at a level that exceeds the preloading force provided by the magnet 60. Those skilled in the art will understand and appreciated that other mechanisms (e.g., one or more springs, a retaining coupling, motor stops, etc.) can be employed to maintain the coupling 54 at a desired position of relative to the plunger 16.

In the example illustrated in FIGS. 1 and 2, the coupling chamber 66 is removably attached to the plunger 16. In particular, the lower end 30 of the plunger sidewall 26 is threaded to receive a corresponding threaded end of the coupling chamber 66. That is, the coupling chamber 66, including the coupling 54 and drive rod 56, are removable relative to the rotary-linear actuator. The threading of the coupling chamber 66 relative to the plunger 16 can be accomplished manually and/or by activation of the ?-axis coils 42 in a desired manner to rotate the plunger about the axis 32. It is to be understood and appreciated, however, that the coupling chamber 66 could be permanently fixed to the plunger 16.

The coupling 54 also includes an arrangement of one or more bearings 68. In the illustrated example, a single bearing is fixed to a central part of the coupling 54 (coaxial with the axis 32) and is dimensioned and configured to engage part of the tool assembly 14 received in the coupling 54. The bearing 68 cooperates with the part of tool assembly (e.g., a drive rod thereof) that is received in the coupling 54 so as to facilitate alignment of the drive rod relative to the coupling 54 as well as maintain desired spacing between the coupling and the magnet 58. The bearing 68 also can provide a pivot between the drive rod of the tool assembly 14 to permit some relative movement between the tool assembly and the coupling 54. It is to be understood and appreciated that other types of bearing arrangements could be utilized in accordance with an aspect of the present invention.

In view of the preloading of the coupling at the distal end 30 of the plunger, the drive rod 46 can move axially commensurate with axial movement of the plunger, such as based on actuation of the linear part of the rotary-linear actuator 12. For example, FIG. 1 illustrates the plunger 16 in a first condition, in which the plunger is retracted. A portion of the drive rod 46 extends axially through the aperture 52 in the housing 18. As the distal end 30 of the plunger moves axially away from the housing 18, the drive rod 46 also moves commensurate with the plunger. FIG. 2 illustrates the plunger 16 in an extended condition in which the distal end 30 of the plunger is spaced a distance from the housing, such as in response to activation of the linear coils 40 of the rotary-linear actuator 12. In the extended motor condition of FIG. 2, the upper end of drive rod 46 has been moved axially through the housing 18, such that the proximal end 48 of the drive rod is within the aperture 52. It is to be appreciated that different lengths of drive rods from that shown herein could be utilized. Additionally, to facilitate substantially free axial movement of the drive rod 46 through the housing 18, appropriate low friction (or no friction) bearings and/or bushings could be employed to help guide the drive rod through the aperture 52 and housing through which the drive rod traverses.

A drive system 72 is operatively coupled to the drive rod 46 to selectively rotate the drive rod about its longitudinal axis. The drive system 72 of FIGS. 1 and 2 is illustrated as including a rotary motor 74 operatively coupled to the drive rod 46 by a belt 76. In particular, the belt 76 extends around a pair of spaced apart axles 78 and 80. One axle 78 is connected to and oriented substantially coaxially with the rotational axis of the drive motor 74. The other axle 80 is operatively connected to and substantially coaxial with the axis of the drive rod 46. The axle 80 includes at least part of the aperture 52 through which part of the drive rod 46 can traverse, which aperture is dimensioned and configured to rotate the drive rod according to rotation of the associated axle 80. As a result, the drive motor 74 transfers movement from the motor axle 78 to the other drive axle 80 through the belt 76, and from the axle 80 to the drive rod 46. While FIGS. 1 and 2 illustrate a belt 76 to indirectly drive the drive rod 46, it is to be understood and appreciated that other types of drive mechanisms (e.g., chain, cables, an arrangement of gears, etc.) also could be employed to rotate the drive rod in a desired manner.

Referring to the partial cross sectional view of FIG. 3, the drive rod 46 has a plurality of elongated ribs (or teeth) 82 along its outer sidewall protruding radially outwardly from an inner portion 84. In the example of FIG. 3, there are four such ribs 82, which provide a generally +-shaped cross-sectional configuration (e.g., symmetrical ribs or teeth) for the drive rod 46. Elongated channels or grooves 86 extend between each adjacent pair of ribs. The channels 86 receive mating teeth (or other protrusions) 88 of a drive gear 90. The operative relationship between the drive gear 90 and the drive rod 46 further permits substantially free axial movement of the drive rod relative to the drive gear. Thus, the drive gear 90 is coupled to the axle 80, such that rotation of the axle is transferred to the drive gear so as to rotate the drive rod 46 about its longitudinal axis, while still permitting desired axial movement between the drive rod and gear.

It is to be understood and appreciated that other shapes and configurations of drive rod and associated drive gear also could be utilized in accordance with an aspect of the present invention. For example, the drive rod 46 could have other cross sectional configurations, such as round, rectangular, hexagonal, octagonal, etc. as well as having any number of teeth (or ribs). The drive gear 90 is configured to cooperate with the drive rod 46 to effect its rotation. The drive rod 46 further has a length that is sufficient to maintain its desired axial orientation as the plunger 16 moves linearly relative to the housing 18 between its minimum and maximum positions, such as shown in FIGS. 1 and 2.

Referring back to FIGS. 1 and 2, the tool assembly 14 is operatively attached at the distal end 30 of the plunger 16. The attachment can be permanent or it could be a removable connection. In the illustrated example, the plunger 16 includes a threaded receptacle 94 at the distal end 30 of the plunger operative to receive an appropriately configured tool assembly 14. The receptacle 94 includes an inner cylindrical sidewall having internal threads 96 for receiving a corresponding part of the tool assembly 14. That is, the tool assembly 14 includes a threaded end portion 98 that is dimensioned and configured for threading into the receptacle 94 of the plunger 16. While FIGS. 1 and 2 illustrate the receptacle 94 of the plunger 16 as having female threads and the tool assembly as having male threads, it is to be understood and appreciated that the plunger could have male threads and the tool assembly could have the female threads. Further, those skilled in the art will understand and appreciate various other means (e.g., snap fittings, friction fittings, fasteners, set screws, etc.) could be employed to removably attach the tool assembly 14 to the actuator 12. Alternatively, in another aspect of the present invention, the tool assembly 14 could be permanently fixed to the plunger 16 by one of the connector means identified above and/or other types of attachment.

By way of illustration, with the threaded attachment shown in FIGS. 1 and 2, activating the actuator 12 in a rotational mode, such as by activating the ?-axis coils 42 in a desired manner, can facilitate the threading of the tool assembly 14 to the plunger 16. For example, by rotating the plunger 16 in a first direction while the tool assembly 14 is held stationary, the tool assembly can be securely attached to the plunger.

Similarly, by rotating the plunger 16 in a second direction, the tool assembly 14 can be detached from the plunger.

The tool assembly 14 includes a drive shaft 102 having an end that is received within a mating receptacle 104 of the coupling 54 when the tool assembly is attached to the plunger 16, as shown in FIG. 1. Referring to FIG. 4, the receptacle 104 has an inner cylindrical sidewall portion 106 that defines a chamber that is dimensioned and configured for receiving a mating end of the drive shaft 102 of the tool assembly 14. The receptacle 104 can have a rectangular, hexagonal, octagonal, or other generally cylindrical configuration capable of matingly receiving the drive shaft 102 so as to so that the drive shaft rotates according to rotation of the coupling 54.

With reference back to FIGS. 1 and 2, the magnetic preload provided by the magnet 60 at the distal end 30 of the plunger 16 facilitates a desired connection, as the magnetic attraction helps urge the coupling 54 onto the portion of the drive shaft 102 that protrudes into the coupling chamber 66 through the respective apertures 62 and 64. The mating relationship between the receptacle 104 and the drive shaft 102 thus enables the drive shaft to rotate commensurate with rotation of the drive rod, as provided by the associated drive system 72. The receptacle 104 can be integral with the coupling 54 or it could be mounted in a corresponding bore formed in the coupling or otherwise attached to the coupling. Those skilled in the art will understand and appreciate various other connection arrangements between the drive shaft 102 and the coupling 54 that can be employed to enable actuation of the tool assembly in response to rotation of the drive rod 46, all of which are contemplated as falling with in the scope of the present invention.

In the particular example illustrated in FIGS. 1 and 2, the tool assembly 14 is in the form of a fluid dispensing system 110, such as can be employed to dispense a desired amount of an adhesive material (e.g., glue). The dispensing system 110 receives a desired fluid 112 to be dispensed via an input port 114, which can be in fluid communication with a source (not shown) of the fluid to be dispensed. For example, the source of fluid can provide a pressurized source of fluid into the dispensing system 110 through an associated (flexible or rigid) conduit 116 to facilitate its dispensing. By way of further illustration, the dispensing system can be employed to dispense a desired amount of any type of fluid, such as a flux material for soldering, an oil material, grease or lubricants, chemical and pharmaceutical compounds, etc.

In order to dispense the fluid, the system further includes an Archimedes screw or other hydraulic or mechanical arrangement 118 capable of dispensing a desired amount of fluid according to rotation of the drive shaft 102. For example, the Archimedes screw 118 includes an outer cylindrical member 120 that extends from a lower opening of the chamber to a location spaced apart from the opening, such as near the opposite end of the chamber near the plunger 16. The cylindrical member 120 surrounds a threaded rod 122 that extends substantially coextensively within the cylinder. The conduit 116 is in fluid communication with cylindrical member 120 to provide the fluid 112 at a desired pressure so as to substantially fill the volume defined by the member. The diameter of the threads, which extend from a central shaft of the threaded rod 122, approximate the inner diameter of the cylindrical member 120. The threaded rod 122 can have any number of turns suitable for dispensing a desired amount of fluid for a predetermined amount of rotation, such as to provide metered application of fluid. An end 124 of the threaded rod 122 is operatively coupled to the drive shaft 102. In a particular aspect of the present invention, the threaded rod 122 can form a lower part of the drive shaft 102, although other mechanisms could be used to transfer movement of the drive shaft to the threaded rod of the Archimedes screw 118.

In order to help maintain the fluid 112 within the cylindrical member 120 of the Archimedes screw 118, a pair of seals 126 circumscribe the drive shaft 102 at a location spaced from the end that is received within the receptacle 104 of the coupling 54. An annular shoulder 128, which is fixed about the drive shaft 102, extends radially outwardly from the drive shaft and is interposed between the seals 126. The engagement between the seals 126 and the shoulder 128 positions the end of the drive shaft 102 at a desired position relative to the coupling 54 and provides a bushing that facilitates rotation of the drive shaft 102 relative to the cylindrical member 120. The seals 126 and shoulder 128 further help prevent fluid from traveling from within the Archimedes screw 118 into the chamber 66. The seals 126 for example, are formed of Teflon or another suitable material that will facilitate generally free rotation of the shoulder 128 relative to the seals and help keep the fluid within the Archimedes screw 118.

A nozzle 130 extends from the opening of the fluid dispensing system 112 to direct the flow of fluid in a desired manner. In one aspect of the present invention (shown in FIG. 1), the nozzle 130 extends from the lower end of the chamber 112 at an acute angle relative to the actuator axis 32 to enable the fluid to be dispensed at a desired angle onto an associated substrate (e.g., a printed circuit board). For example, it may be desirable to dispense an adhesive fluid from the angled nozzle 130, such as depending on the relative orientation of a component being attached to a circuit board. Thus, the plunger 16 can be rotated relative to the housing 18 to appropriately position the nozzle 130 at a desired angular orientation relative to the work piece or substrate. Alternatively or additionally, the nozzle 130 might include a plurality of different orifices (not shown) that can be selected for dispensing fluid depending on the particular application where the fluid is being dispensed. The rotation of the plunger or another actuator further can be implemented to index between different orifices associated with the nozzle 130.

By way of further illustration, FIG. 5 depicts another example of a tool system 200 in accordance with an aspect of the present invention. The tool system includes a rotary-linear actuator 202 that is substantially identical to the rotary-linear actuator drive system shown and described with respect to FIGS. 1 and 2. For purposes of brevity, a detailed description of the rotary-linear actuator 202 and its possible implementations has been omitted, as reference can be made back to the description of FIGS. 1 and 2 for additional information.

Briefly stated, the actuator 202 includes a plunger 204 that is moveable relative to a housing 206 having spaced apart ends 208 and 210. The plunger 204, which has spaced apart ends 212 and 214, can move rotationally about and/or linearly along an axis 216 that extends longitudinally through the actuator 202. The rotary and/or linear movement of the plunger 204 relative to the housing 206 is facilitated by an arrangement of windings 218 and magnets 220, such as shown and described herein. Appropriate bearings (low friction or air bearings) or other guide mechanisms (not shown) facilitate desired relative motion between the plunger 204 and housing 206.

In accordance with an aspect of the present invention, the system 200 further includes an elongated drive rod 222 having end portions 224 and 226 that are spaced apart from each other. For example, the drive rod 222 extends substantially coaxially through the plunger 204 and the housing 206. The drive rod 222 is mounted for substantially free axial movement relative to the housing 206, such as commensurate with axial movement of the plunger 204.

The distal end 226 of the drive rod 222 is connected to a coupling 228 located near the distal end 214 of the plunger 204. The coupling 228 can be at a generally fixed axial position relative to the plunger 204 or it can be axially moveable with in a chamber 230 located near the end 214 of the plunger. For example, the coupling 228 can be preloaded by a magnet 232 toward a rigid shelf or other support structure 234 located at the end 214 of the plunger 204. The coupling 228 further includes a receptacle 236 having a bearing or pivot element 237. The receptacle 236 is dimensioned and configured for receiving a corresponding drive element 238 of a tool assembly 239. The bearing 237 facilitates alignment and receipt of the drive element 238. The coupling 228 thus rotates about the axis 216 according to rotation of the drive rod 222, which in turn causes corresponding rotation of the drive element 238 received in the receptacle 236.

In the example of FIG. 5, a drive system 240 is operatively coupled to rotate the drive rod 222 and associated coupling 228 about the longitudinal axis 216. In this example, the drive system 240 is implemented as a direct drive system, such as a servomotor or other type of direct drive mechanism that transfers rotation force directly to the drive rod 222. The direct drive system 240 can be mounted at the proximal end 208 of the housing, as shown in FIG. 5, such that the drive rod 222 extends through a corresponding aperture 242 extending through a rotor 244 of the drive system 240. The aperture 242 is dimensioned and configured to engage the drive rod 222 to rotate the drive rod about its axis commensurate with rotation of the rotor. Additionally, the drive rod 222 can move axially substantially freely relative to the drive system 240, such as when the plunger 204 moves axially relative to the housing 206.

The rotor 244, for example, includes a circular array of magnets 246 of alternating polarity mounted around a central core 248 to provide for selected rotation relative to a stator 250 fixed relative to the housing 206. The aperture 242 extends through the core 248. The stator 250 includes windings 252 arranged in a generally circular array about the rotor 244. The windings 252 are selectively energized to effect desired rotation of the rotor 244 relative to the stator 250, which in turn drives the drive rod 222 about its axis. Those skilled in the art will understand various other types and configurations of direct drive systems that could be employed to rotate the drive rod 222 in accordance with an aspect of the present invention. Additionally, while the direct drive system 240 is illustrated as being mounted to the proximal end of the actuator housing, those skilled in the art will understand and appreciate that the drive system, alternatively, could be located within the interior the housing 206, such as near the proximal end 208 thereof.

In FIG. 5, the tool assembly 239 is illustrated in its detached condition relative to the plunger 204. That is, the tool assembly 239 is removably connectable to the plunger 204 in accordance with an aspect of the present invention. For example, the tool assembly 239 has a threaded portion 254 that can be threaded to a corresponding threaded end portion 256 of the plunger 204. The tool assembly 239 further includes a drive shaft 258 that extends axially from the proximal end of the tool assembly and terminating in the drive element 238 for receipt within the receptacle 236 of the coupling. The drive element 238 and receptacle 236 are dimensioned and configured to provide a desired mating connection therebetween, such that rotation of the coupling 228 results in corresponding rotation of the drive shaft 258, thereby actuating the tool assembly 239. Alternatively, the drive shaft 258 could be configured for mating connection with the receptacle 236 of the coupling 228.

In the example of FIG. 5, a drill bit 260 extends axially from a base portion of the tool assembly 239. The drill is rotatable independently of rotation and axial movement of the plunger 204 relative to the housing 206, such as in response to activation of the drive system 240. Those skilled in the art will understand and appreciate various other types of tool assemblies that could be utilized in conjunction with a rotary-linear actuator tool system in accordance with an aspect of the present invention. Similar to the fluid dispensing system of FIG. 1, such other tools also can be configured for attachment to the distal end of the plunger, although different attachment mechanisms (permanent or removable) also could be employed. For example, a pick-and-place system, which can include a clamp member activated by the drive system 240 and a vacuum or suction member (coupled to a vacuum source) could be utilized to grasp and hold items.

Figure 6:
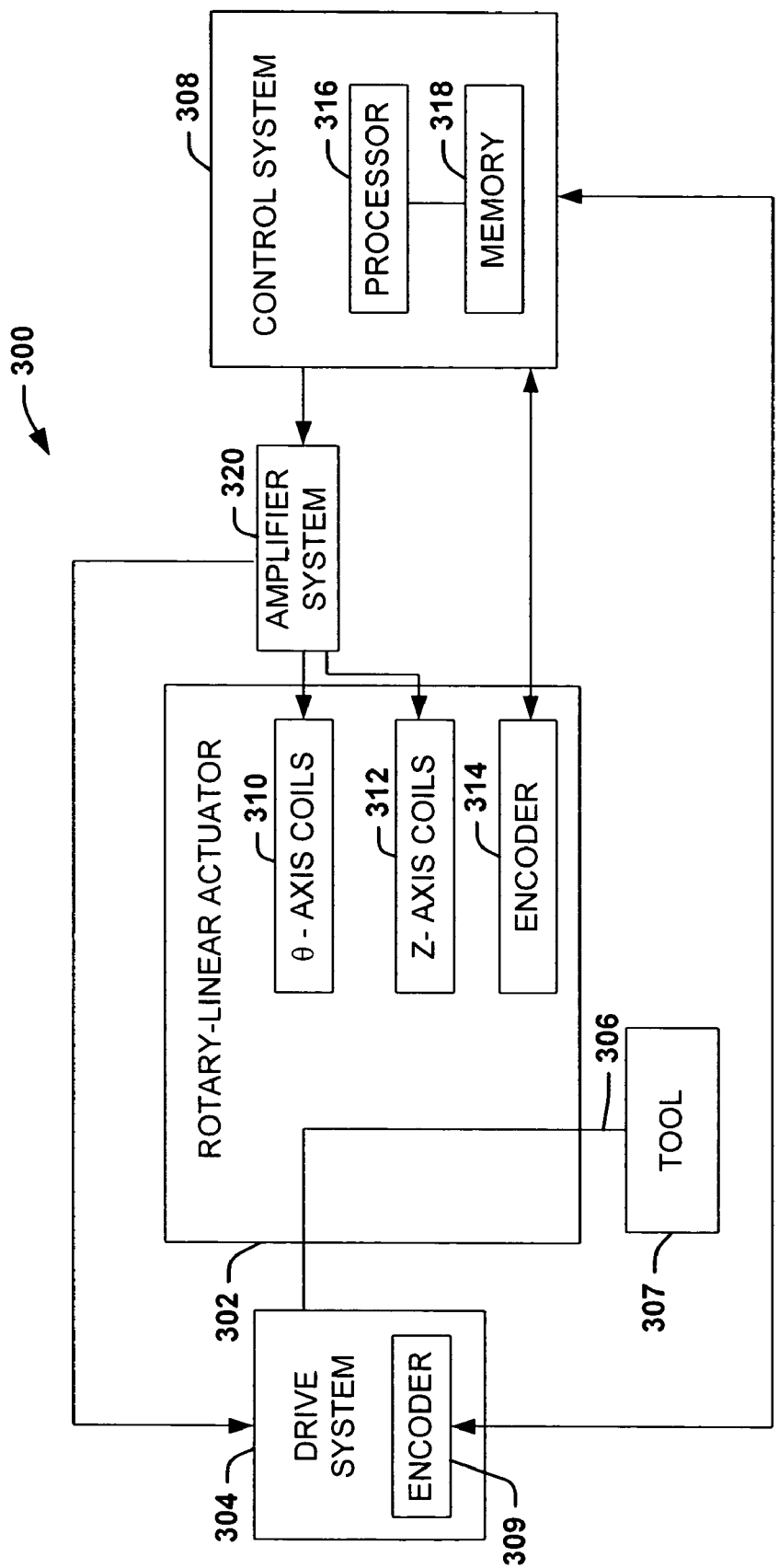
FIG. 6 is a functional block diagram of a rotary-linear tool system in accordance with an aspect of the present invention.

FIG. 6 illustrates an example of a functional block diagram of a system 300 in accordance with an aspect of the present invention. The system 300 includes a rotary-linear actuator 302 and a drive system 304. The drive system 304, for example, is operatively coupled to a drive rod, schematically illustrated at 306, which extends through at least a portion of the actuator 302 and operatively connected to an associated tool system 307. One or more associated control systems 308 are operative to control operation of the associated components of the tool system 300, including the rotary linear actuator 302 and/or the drive system 304. The drive system 304 also includes an encoder or resolver 309 that provides position information to the control system 308 indicative of the relative position of a rotor and stator of the drive system. The control system 308 thus controls operation of the drive system 304 in a desired manner based on the position information from the encoder 309.

By way of further example, the rotary-linear actuator 302 includes z-axis coils 310 and ?-axis coils 312, which are operative to provide desired linear and/or rotary movement of the actuator. The actuator 302 also includes an encoder system 314, such as may include one or more encoders, for sensing the relative position of the plunger and providing an encoder signal indicative of the sensed position. The encoder system 314 may include an optical sensor in which the sensor detects markings or other indicia located on and moveable with the plunger. It is to be understood and appreciated, however, that any type of encoding system (e.g., optical, magnetic, inductive, capacitive, etc.) could be utilized in accordance with an aspect of the present invention.

The control system 308 can include a processor 316 coupled to memory 318, which may be programmed and/or configured to control operation of the rotary-linear actuator in a desired manner as well as to control and synchronize operation of the drive system 304 so that the associate tool system can interact with a work piece in a desired manner. The memory 318 stores program code executed by the processor 316 for carrying out operating functions of the system as described herein. The memory 318 also serves as a storage medium for temporarily storing information such as various sensed conditions of the module, an indication of the control information implemented by the processor, and other data that may be employed in carrying out the present invention.

The processor 316 is coupled to amplifier system 320, which may include one or more amplifiers associated with the different sets of windings 310, 312 in the actuator 302 as well as in the drive system 304. The amplifier(s) 320, for example, can include switching networks for providing a desired level of electrical current (e.g., by pulse-width-modulation or linear current control) to the coils and based on control signals from the control system 308. The control system 308 also is connected to the encoder system 314 for receiving position information indicative of the position and/or movement of the plunger. The processor 316 thus controls the amplifiers to, in turn, control energization of each phase of the respective coils 310, 312 based on the position information so as to effect desired movement of the plunger. The processor 316 also can control activation of the drive system 304 so as to effect desired rotation of the drive rod 306, which results in desired operation of the associated tool.

By way of example, the control information may be derived by using a look-up table having predetermined stored values or by calculation in accordance with a desired control function. That is, executable instructions and/or program data are stored in the memory 318 to define operating characteristics for the module. The control information is derived according to the program instructions executing at the processor 316. Alternatively control instructions can be derived in real time by processing the sensed characteristics of the respective motive systems with suitable control algorithms.

The system 300 further can include other sensors (e.g., current sensors, force sensors, etc. (not shown)) that provide corresponding feedback information, based on which the processor may adjust the control signals to the amplifier 320 to appropriately increase or decrease the amount of current being provided to selected parts of the system. In addition or alternatively, the executable instructions in memory may control the module to implement a set of predefined movements with the rotary-linear actuator, such as may include a combination of rotational or linear movements of the plunger along the respective Z and/or ? axes. The particular movements will vary as a function of the application in which the system is being utilized. The processor 316 may control each amplifier independently or dependently according to the stored program instructions.

By way of further example, if the tool system 307 is implemented as a glue dispensing system for gluing circuit components onto a printed circuit board, the actuator can position the nozzle at a desired position relative to the board and rotate the plunger to orient the nozzle at desired angular orientation relative to the board, such as according to the type of component being attached and/or its orientation relative to the circuit board. After the nozzle is appropriately positioned by activation of the Z and/or ?-axis coils 310 and 312, the drive system 304 can be actuated to rotate the drive rod 306, such that a desired amount of glue is dispensed onto the circuit board. The tool system 300 and/or the board itself can then be moved (e.g., by single or multiple axis linear motor system) and the nozzle repositioned for dispensing glue at the next position. This process, thus, can be repeated until all components have been appropriately attached to the circuit board.

Figure 7:
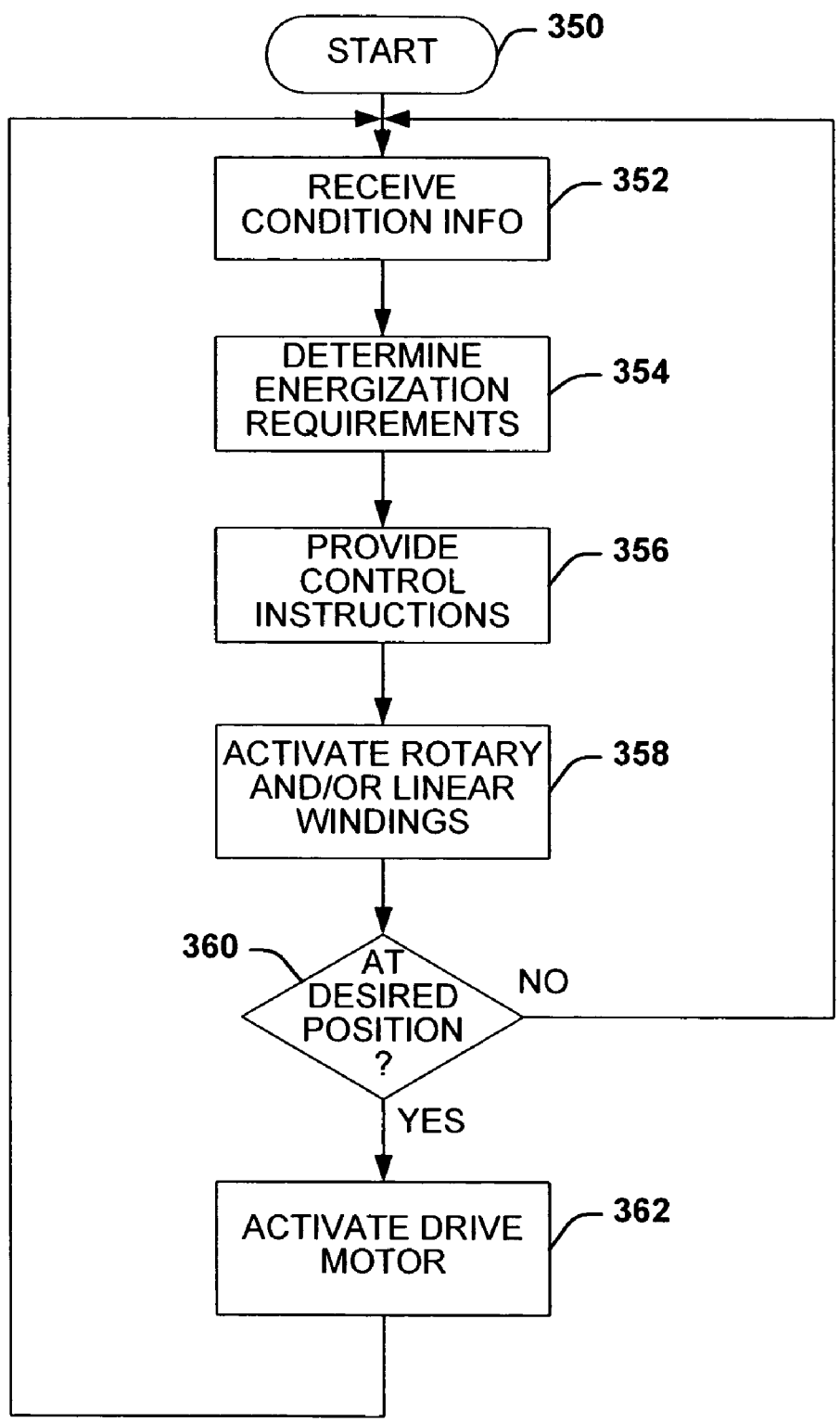
FIG. 7 is a flow diagram illustrating a methodology for operating a rotary-linear tool system in accordance with an aspect of the present invention.

In view of the foregoing structural and functional features described above, the functionality of a tool system that may be implemented in accordance with the present invention will be better appreciated with reference to FIG. 7. While, for purposes of simplicity of explanation, the methodology of FIG. 7 is shown and described as a flow diagram executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

The particular methodology may be implemented at a central motor controller, such as to control each motive device that forms part of a tools system according to an aspect of the present invention. The methodology begins at 350, such as in response to powering up the linear motor system, in which variables and parameters are set to their starting values. Next, at 352, condition information, which can include position and/or movement data, is received for each of the motor systems. For example, the condition information can include axial (Z-axis) and rotational (?-axis) positions of a rotary-linear actuator, such as provided by one or more encoder systems operatively associated with the actuator. The position data also can include position information of an associated drive system operative to control movement of a drive rod (or other type of drive component) that extends through at least a substantial portion of the rotary-linear actuator. Examples of encoders that could be utilized, in accordance with an aspect of the present invention, include magnetic encoders, inductive encoders, capacitive encoders, and/or optical encoders. Such encoders may provide their position data via a physical communications link and/or a wireless communications link employing a known communications protocol. From 352, the methodology proceeds to 354.

At 354, energization requirements are determined for each of the motive devices based on the condition information as well as other data. The other data, for example, provides an indication of conditions associated with an environment and/or process in which the tool system is being implemented. The determination of how to energize the associated motive devices, for example, can be made by a microprocessor programmed and/or configured with a look-up table that provides a current or voltage command signal as a function of position data and condition data. Alternatively or additionally, motor control algorithms may be implemented to calculate control requirements, such as may include the magnitude and direction of electric current that should be applied to which winding(s) to effect a desired axial and/or rotary movement of the actuator. After the control requirements have been determined, the methodology proceeds to 356.

At 356, the control instructions are provided to energize selected windings. For example, the control instructions are provided to one or more amplifiers that selectively activate (358) desired windings of the rotary-linear actuator. The electrical energy provided to the actuator motors results in desired rotary and/or linear movement of a moveable plunger portion of the actuator. Next at 360, a determination is made as to whether the plunger has been moved to a desired position, which can include axial and rotational positions. The axial and rotational positions of the plunger can be extrapolated to determine the position and orientation of the tool assembly attached to the plunger. If the determination is negative, indicating that the plunger is not at a desired relative position, the methodology returns to 352, in which condition information is received, such as based on position and other characteristics that are sensed. The condition information is then used to control operation of the rotary-linear actuator, as described above. Appropriate feedback, such as from sensed conditions, can be used to further adjust operating parameters of the system. Once the plunger is determined to be at a desired position, the drive motor is energized so as to activate the associated tool assembly (362) by moving the drive rod that extends through the rotary-linear actuator, such as to perform a desired operation on a work piece or other item.

By way of example, the tool assembly can include a glue dispensing system, a pick and place system, a rotational tool (e.g., drill, screw driver, wrench) or other appliance for which it may be desirable to position with substantially high accuracy relative to a work piece or item. The drive motor can be activated to perform a desired operation, such as based on feedback which indicates progress of the operation and when the operation is complete. Alternatively, the drive motor can be activated to rotate an associated drive rod a desired amount, such as to a predetermined operation. After the The foregoing example can be repeated to implement desired operations with the associated tool assembly, such as part of a manufacturing process.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system that facilitates operation of a tool, comprising:
   a moveable member having a length, that moves in a rotary motion about a central axis and a linear motion along the central axis to position an associated drive member; and
   the drive member is parallel to the central axis, and extends the length of the moveable member to engage the tool, which drive member operates independently of the moveable member.

2. The system of claim 1, the drive member extends through the moveable member to engage the tool.

3. The system of claim 1, the drive member is a rod that is axially aligned with the central axis.

4. The system of claim 1, further comprising a coupling that is affixed to one end of the drive member such that the coupling loosely engages the tool to facilitate driving the tool.

5. The system of claim 1, the drive member drives the tool, which facilitates at least one of dispensing a fluid, cutting, drilling.

6. The system of claim 1, further comprising a drive system that couples to the drive member, which drive member slidably engages the drive system.

7. The system of claim 1, further comprising a control system that controls at least one of the rotary motion, and the linear motion of the moveable member, and the linear motion of the drive member.

8. The system of claim 1, the moveable member includes positioning means that facilitate controlling at least one of the rotary motion to a predetermined a rotary position and the linear motion to a predetermined a linear position.

9. The system of claim 8, the positioning means comprises magnetic means.

10. The system of claim 1, further comprising a coupling chamber that couples the tool to the moveable member.

11. The system of claim 1, further comprising a housing that partially houses the moveable member such that the linear motion extends the moveable member substantially therefrom.

12. A method of operating a tool, comprising:
    coupling a moveable member to the tool;
    rotating the moveable member about a central axis and moving the moveable member along the central axis to position an associated drive rod; and
    driving part of the tool with the drive rod that operates independently of motion of the moveable member.

13. The method of claim 12, the drive rod is axially aligned with the central axis.

14. The method of claim 12, the moveable member is at least one of rotated about the central axis and moved along the central axis by a magnetic drive system.

15. The method of claim 12, further comprising engaging one end of the drive rod with a drive system.

16. The method of claim 12, further comprising preloading one end of the moveable member such that the tool is urged into contact therewith.

17. The method of claim 12, further comprising affixing a drive coupling at one end of the drive rod to engage the tool.

18. The method of claim 12, further comprising driving the drive rod with a direct drive system such that the drive rod extends though the direct drive system.

19. The method of claim 12, further comprising performing the acts of rotating and moving substantially simultaneously.

20. The method of claim 12, further comprising:
    controlling the moveable member according to at least one of rotational movement and linear movement to arrive at a predetermined position; and
    sensing the position of the moveable member with a sensor.

21. The method of claim 12, the act of driving occurs in response to sensing the moveable member at the predetermined position.

22. The method of claim 12, further comprising controlling the moveable member with a feedback control system such that progress of a task being performed by the tool is controlled.

23. A system for operating a tool, comprising:
    means for providing rotary movement of a moveable member about a central axis and for linear movement of the moveable member along the central axis to position an associated drive member; and
    means for driving part of the associated tool independently of movement of the moveable member, the associated tool is attached to the means for providing and the means for driving extends through at least a portion of the means for providing.

24. The system of claim 23, further comprising means for rotating the means for driving about an axis thereof, the means for rotating being operatively coupled to the means for providing.

25. The system of claim 24, the means for driving further comprising a drive rod that extends through the means for providing and is independently rotatable relative to rotary movement of the moveable member.

26. The system of claim 24, further comprising means for dispensing fluid in response to rotation of the drive rod.

27. The system of claim 26, the means for dispensing includes a screw that dispenses the fluid according to rotation of the drive rod.

28. The system of claim 24, the tool is removably engaged to the means for providing.

29. The system of claim 23, the means for driving is at least one of a direct drive system and an indirect drive system.

30. The system of claim 23, the means for providing includes magnetic means that facilitate the linear movement.

31. The system of claim 23, further comprising a coupling means that couples the tool to the moveable member.

* * * * *